(12) United States Patent
Kita et al.

(10) Patent No.: US 11,745,889 B2
(45) Date of Patent: Sep. 5, 2023

(54) AIRCRAFT PROPULSION SYSTEM

(71) Applicant: HONDA MOTOR CO., LTD., Tokyo (JP)

(72) Inventors: Akinori Kita, Wako (JP); Takeshi Matsumoto, Wako (JP); Daiko Tsutsumi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 23 days.

(21) Appl. No.: 17/539,231

(22) Filed: Dec. 1, 2021

(65) Prior Publication Data

US 2022/0194621 A1 Jun. 23, 2022

(30) Foreign Application Priority Data

Dec. 22, 2020 (JP) ................... 2020-212825

(51) Int. Cl.
| | | |
|---|---|---|
| B64D 33/08 | (2006.01) | |
| B64D 27/02 | (2006.01) | |
| B64D 35/08 | (2006.01) | |
| B64C 27/14 | (2006.01) | |
| B64D 27/10 | (2006.01) | |
| B64D 27/24 | (2006.01) | |
| B64C 27/32 | (2006.01) | |

(52) U.S. Cl.
CPC .............. *B64D 35/08* (2013.01); *B64C 27/14* (2013.01); *B64C 27/32* (2013.01); *B64D 27/10* (2013.01); *B64D 27/24* (2013.01); *B64D 33/08* (2013.01); *B64D 2027/026* (2013.01)

(58) Field of Classification Search
CPC ........................... B64D 2027/026; B64D 33/08
See application file for complete search history.

(56) References Cited

U.S. PATENT DOCUMENTS

| | | | |
|---|---|---|---|
| 8,727,271 B2 | 5/2014 | Salyer | |
| 9,493,245 B2 | 11/2016 | Salyer | |
| 2020/0130853 A1* | 4/2020 | Stuckey | .................. F01D 15/10 |
| 2020/0148375 A1* | 5/2020 | Huang | ................... B64D 27/24 |
| 2020/0149427 A1* | 5/2020 | Long | ...................... F01D 15/10 |

OTHER PUBLICATIONS

Ian Moir and Allan Seabridge, Aircraft Systems: Mechanical, electrical, and avionics subsystems integration, Third Edition, 2008, (pp. 56-58, and 81-178) (Year: 2008).*

* cited by examiner

*Primary Examiner* — Philip J Bonzell
*Assistant Examiner* — Justin Michael Heston
(74) *Attorney, Agent, or Firm* — AMIN, TUROCY & WATSON, LLP (57) ABSTRACT

An aircraft propulsion system capable of improving the restartability of an engine is provided. An aircraft propulsion system includes: a plurality of engines (60-1 and 60-2); an electric generator connected to engine shafts (63-1 and 63-2); a plurality of electric motors; a plurality of rotors; and a controller (100) which controls an operation state of the plurality of engines (60-1 and 60-2). The controller (100) causes a part of the plurality of engines (60-1 and 60-2) to operate while stopping the remaining engine when a flight state is in a first state. The plurality of engines (60-1 and 60-2) include circulators (65-1 and 65-2). A plurality of communication pipes (68 and 69) which communicate the circulator (65-1) in the first engine (60-1) among the plurality of engines (60-1 and 60-2) with the circulator (65-2) in the second engine (60-2) are provided.

10 Claims, 4 Drawing Sheets

AIRCRAFT PROPULSION SYSTEM

CROSS-REFERENCE TO RELATED APPLICATION

Priority is claimed on Japanese Patent Application No. 2020-212825, filed Dec. 22, 2020, the content of which is incorporated herein by reference.

BACKGROUND OF THE INVENTION

Field of the Invention

The present invention relates to an aircraft propulsion system.

Description of Related Art

In the related art, aircraft propulsion systems in which a plurality of engines are attached to an aircraft main body and an electric generator is connected to the engines are known (for example, Patent Document 1 (the specification of U.S. Pat. No. 8,727,271) and Patent Document 2 (the specification of U.S. Pat. No. 9,493,245)). In these aircraft propulsion systems, the electric power supplied to the electric generator and/or the electric power supplied to a storage battery is supplied to an electric motor and the electric motor drives a plurality of rotors.

SUMMARY OF THE INVENTION

In this type of aircraft propulsion system, from the viewpoint of power generation efficiency, it is conceivable to stop a part of an electric generator in some cases (for example, at the time of cruising with a small electric power load).

However, in this case, if an engine is kept stopped for a long period of time, there is a concern of freezing of a working fluid (for example, lubricating oil) required for operating the engine. As a result, at the time of starting up the engine which has stopped again, there is a problem that a restarting-up time may increase. Starting-up of the engine again is necessary, for example, when an engine which is in operation breaks down, at the time of landing in which an electric power load is high, and the like.

The present invention was made in consideration of such circumstances, and an object of the present invention is to provide an aircraft propulsion system capable of improving the restartability of an engine.

An aircraft propulsion system according to the present invention has the following constitutions.

(1) An aircraft propulsion system according to an aspect of the present invention includes: a plurality of engines attached to an airframe of an aircraft; an electric generator connected to an engine shaft of each of the engines; a plurality of electric motors driven using an electric power including the electric power generated by the electric generator; a plurality of rotors attached to the airframe of the aircraft and driven using a driving force output by the electric motors; and a controller which controls an operation state of the plurality of engines, in which the controller causes some of the plurality of engines to operate while stopping the remaining engines when a flight state of the aircraft is a first state after the plurality of engines are made to operate and the aircraft takes off, wherein each of the plurality of engines has a circulator having a working fluid circulating therein, and a plurality of communication pipes which allow the circulator in a first engine among the plurality of engines to be communicating with respect to the circulator in a second engine among the plurality of engines are provided.

(2) In the aircraft propulsion system according to the above aspect (1), a fluid pressure pump which causes the working fluid to circulate in the circulator may be provided in the circulator, the plurality of communication pipes may include a first communication pipe and a second communication pipe, the first communication pipe may allow a portion of the circulator in the first engine which is located on a downstream side of the fluid pressure pump to be communicating with respect to a portion of the circulator in the second engine which is located on an upstream side of the fluid pressure pump, and the second communication pipe may communicate a portion of the circulator in the first engine which is located on an upstream side of the fluid pressure pump with a portion of the circulator in the second engine which is located on a downstream side of the fluid pressure pump.

(3) In the aircraft propulsion system according to the above aspect (1) or (2), a valve may be provided in each of the plurality of communication pipes.

(4) In the aircraft propulsion system according to the above aspect (3), the controller may open the valve when a flight state of the aircraft is the first state and close the valve in other cases.

(5) In the aircraft propulsion system according to any one of the above aspects (1) to (4), the controller may cause the first engine and the second engine to operate alternately when the flight state of the aircraft is the first state.

(6) In the aircraft propulsion system according to the above aspect (5), a fluid sensor which acquires at least one of a temperature and a pressure of the working fluid circulating in the circulator may be provided in the circulator, and the controller may switch between an operation of the first engine and the second engine based on acquisition results of the fluid sensor.

(7) In the aircraft propulsion system according to any one of the above aspects (1) to (6), the aircraft propulsion system may further include: an acquisition unit which acquires flight information associated with flight of the aircraft, wherein the controller may control an operation state of the plurality of engines based on the flight information acquired by the acquisition unit.

(8) In the aircraft propulsion system according to any one of the above aspects (1) to (7), the first state may be a state in which the aircraft reaches a prescribed altitude and then moves in a direction including a horizontal direction.

(9) In the aircraft propulsion system according to any one of the above aspects (1) to (8), the controller may control the aircraft by causing the plurality of engines to operate when the flight state of the aircraft is in a second state different from the first state.

(10) In the aircraft propulsion system according to any one of the above aspects (1) to (9), the working fluid may be lubricating oil supplied to a bearing which supports the engine shaft.

In the present invention, each of the plurality of engines includes the circulator. In the engine which is in operation, it is possible to maintain a working fluid at a high temperature by causing the working fluid to circulate in the circulator.

The plurality of communication pipes communicate the circulator of the first engine (hereinafter referred to as a "first circulator") and the circulator of the second engine (hereinafter refer to as a "second circulator"). Therefore, it is possible to cause a working fluid circulating in the first circulator and the working fluid circulating in the second circulator to circulate through the plurality of communication pipes. For example, it is possible to cause a working fluid to flow from the first circulator to the second circulator through the first communication pipe among the plurality of communication pipes and cause the working fluid to flow from the second circulator to the first communication mechanism through the second communication pipe among the plurality of communication pipes.

Therefore, for example, when the second engine has stopped while the first engine is operating, and the like, it is possible to supply a working fluid circulating in the first circulator which has a relatively high temperature to the second circulator and cause this working fluid to circulate in the second circulator. Thus, it is possible to raise a temperature of a working fluid circulating in the second circulator even when the second engine has stopped. As a result, it is possible to inhibit freezing of a working fluid in the second engine and it is possible to improve the restartability of the engine.

According to the aspects (1) to (10), it is possible to improve the restartability of an engine.

DETAILED DESCRIPTION OF THE INVENTION

Embodiments of an aircraft propulsion system of the present invention will be described below with reference to the drawings.

[Overall Constitution]

Figure 1:
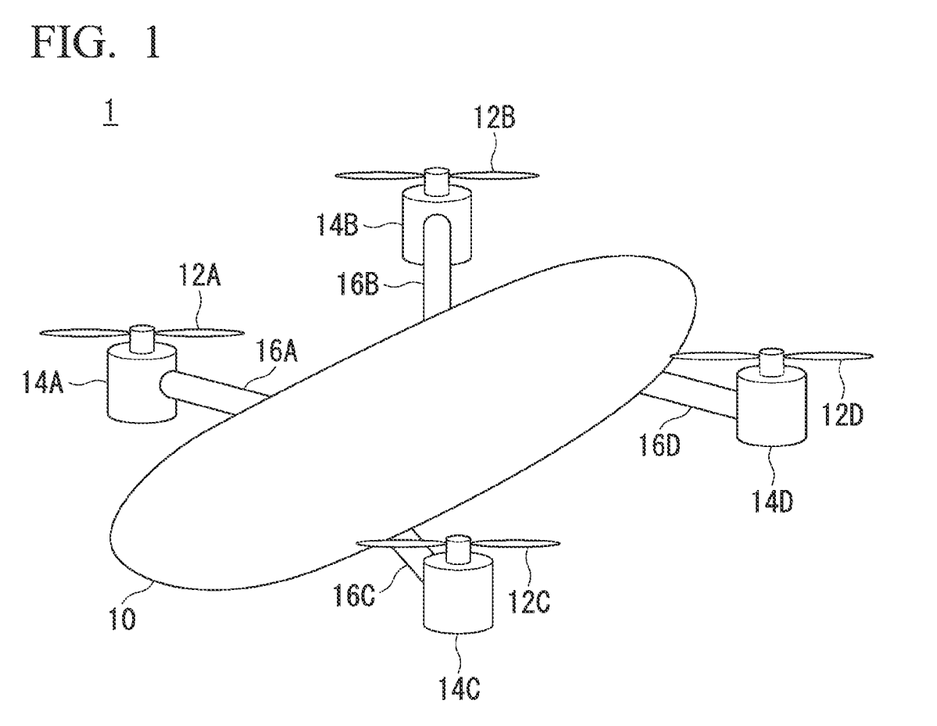
FIG. 1 is a schematic diagram of a flying body 1 having an aircraft propulsion system installed therein.

FIG. 1 is a schematic diagram of a flying body 1 (an aircraft in the claims) having an aircraft propulsion system installed therein. The flying body 1 includes, for example, an airframe 10, a plurality of rotors 12A to 12D, a plurality of electric motors 14A to 14D, and arms 16A to 16D. Hereinafter, when the plurality of rotors 12A to 12D are not distinguished from each other, the rotors 12A to 12D are referred to as a "rotor 12" and when the plurality of electric motors 14A to 14D are not distinguished from each other, the electric motors 14A to 14D are referred to as an "electric motor 14." The flying body 1 may be a manned flying body or an unmanned flying body. The flying body 1 is not limited to a multi-copter shown in the drawing and may be a helicopter or a compound type flying body including both rotary wings and fixed wings.

The rotor 12A is attached to the airframe 10 via the arm 16A. The electric motor 14A is attached to a base portion (a rotating shaft) of the rotor 12A. The electric motor 14A drives the rotor 12A. The electric motor 14A is, for example, a brushless DC motor. The rotor 12A is a fixed wing of a blade which rotates around an axial line parallel to a direction of gravity when the flying body 1 is in a horizontal attitude. The rotors 12B to 12D, the arms 16B to 16D, and the electric motors 14B to 14D also have the same functional constitution as described above, and thus a description thereof will be omitted.

When the rotor 12 rotates in accordance with a control signal, the flying body 1 flies in a desired flight state. The control signal is a signal for controlling the flying body 1 based on an operator's operation or an instruction in autopilot. For example, the flying body 1 flies by rotating the rotor 12A and the rotor 12D in a first direction (for example, clockwise) and rotating the rotor 12B and the rotor 12C in a second direction (for example, counterclockwise). In addition to the rotor 12 described above, an auxiliary rotor or the like for maintaining an attitude or for horizontal propulsion (not shown) may be provided.

Figure 2:
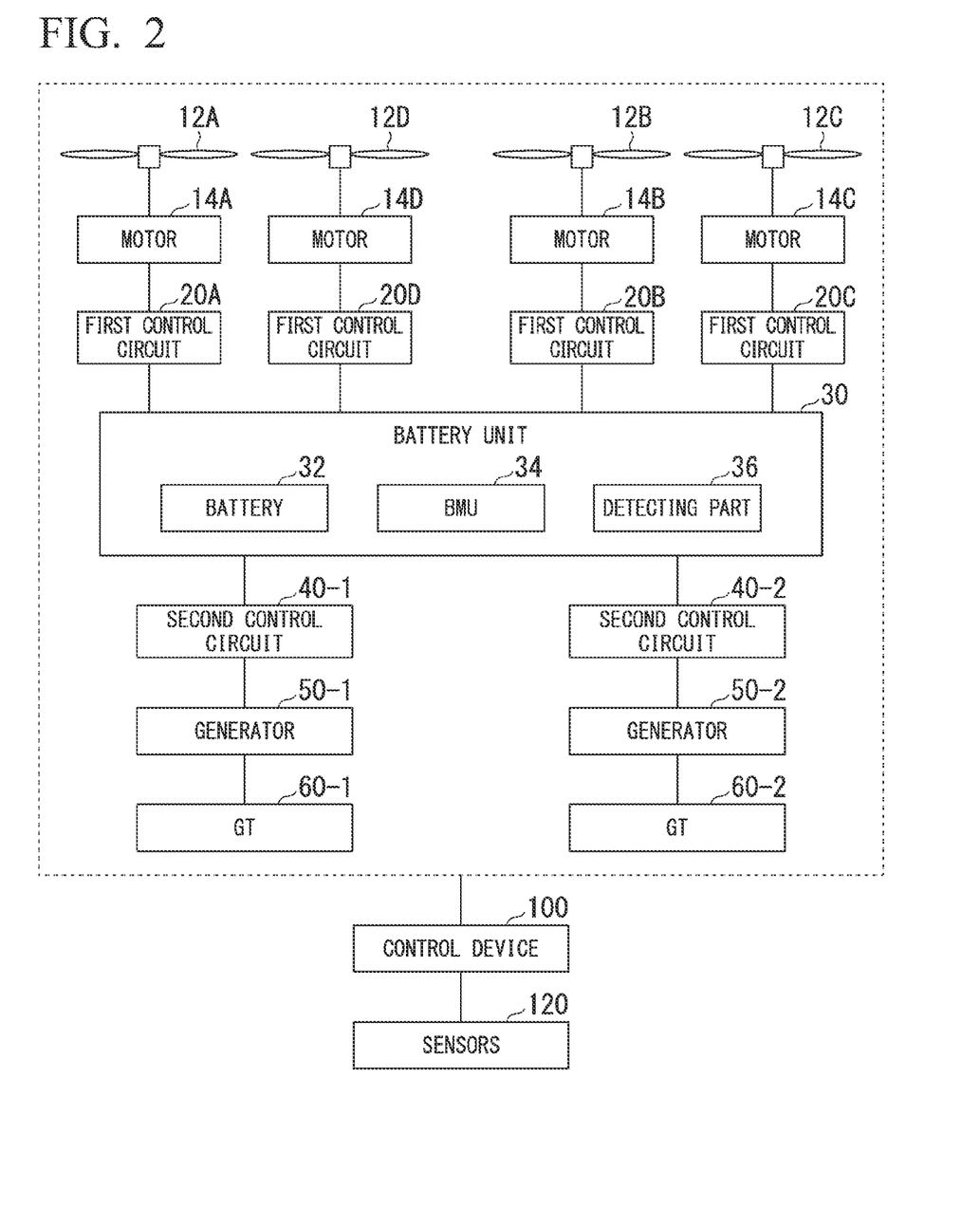
FIG. 2 is a diagram showing an example of a functional constitution of the flying body 1.

FIG. 2 is a diagram showing an example of functional constitution of the flying body 1. In addition to the constitution shown in FIG. 1, the flying body 1 includes, for example, first control circuits 20A, 20B, 20C, and 20D, a storage battery unit 30, second control circuits 40-1 and 40-2, electric generators 50-1 and 50-2, and gas turbine engines (hereinafter referred to as a "GT") 60-1 and 60-2. The constitution in which the number "1" has been added after reference numerals and hyphens is a first constitution corresponding to the rotor 12A, the rotor 12D, the electric motor 14A, the electric motor 14D, the first control circuit 20A, and the first control circuit 20D. The constitution to which the number "2" after reference numeral and the hyphen is added is a second constitution corresponding to the rotor 12B, the rotor 12C, the electric motor 14B, the electric motor 14C, the first control circuit 20B, and the first control circuit 20C. The first constitution will be described below as a representative. In addition, since the second constitution is the same as the first constitution, a description thereof will be omitted.

The first control circuit 20A is a power drive unit (PDU) including a drive circuit such as an inverter. The first control circuit 20A supplies an electric power obtained by converting an electric power supplied by the storage battery unit 30 through switching or the like to the electric motor 14A. The first control circuit 20D is a PDU like the first control circuit 20A and supplies an electric power supplied by the storage battery unit 30 to the electric motor 14D. The electric motor 14A drives the rotor 12A and the electric motor 14D drives the rotor 12D.

The storage battery unit 30 includes, for example, a storage battery 32, a battery management unit (BMU) 34, and a detecting part 36. The storage battery 32 is, for example, an assembled battery obtained by connecting a plurality of battery cells in series, parallel, or series-parallel. The battery cells constituting the storage battery 32 are, for example, a secondary battery such as a lithium-ion battery (LIB) or a nickel hydride battery which is capable of repeatedly performing charging and discharging.

The BMU 34 performs cell balancing, abnormality detection of the storage battery 32, derivation of a cell temperature of the storage battery 32, derivation of a charge/discharge current of the storage battery 32, estimation of an SOC of the storage battery 32, and the like. The detecting part 36 is a voltage sensor, a current sensor, a temperature sensor, or the like for measuring a charging state of the storage battery 32. The detecting part 36 outputs the measurement results such as the measured voltage, current, and temperature to the BMU 34.

The flying body 1 may include a plurality of storage battery units 30. For example, the storage battery unit 30 corresponding to each of the first constitution and the second constitution may be provided. Although the electric power generated by the electric generator 50 is supplied to the storage battery 32 in the embodiment, the present invention is not limited thereto. The electric power generated by the electric generator 50 may be supplied to the first control circuits 20 and the electric motors 14 without going through the storage battery 32 (or selectively through the storage battery 32).

The second control circuit 40-1 is a power conditioning unit (PCU) including a converter and the like. The second control circuit 40-1 converts an alternating current (AC) electric power generated by the electric generator 50-1 into a direct current (DC) electric power and supplies the converted electric power to the storage battery 32 and/or the first control circuits 20.

The electric generator 50-1 is connected to an output shaft of the GT (an engine in the claims 60-1. The electric generator 50-1 is driven by operating the GT 60-1 and an AC electric power is generated through this driving. The electric generator 50-1 may be connected to the output shaft of the GT 60-1 via a speed-reduction mechanism. The electric generator 50-1 may function as a motor, and when the supply of fuel to the GT 60-1 stops, the GT 60-1 may rotate (idle) such that it can be brought into an operational state. At that time, the second control circuit 40-1 can take out an electric power from the storage battery 32 side to motor the electric generator 50-1. Instead of the functional constitution described above, a starter motor 64-1 which will be described later may be connected to the output of the GT 60-1 and the starter motor 64-1 may make the GT 60-1 operational.

The GT 60-1 is, for example, a turboshaft engine. A detailed constitution of the GT 60-1 will be described later.

A control device 100 (a controller in the claims) is realized using, for example, a program (software) executed by a hardware processor such as a central processing unit (CPU). Some or all of functions of the control device 100 may be realized through hardware (a circuit unit; including a circuitry) such as a large scale integration (LSI), an application specific integrated circuit (ASIC), a field-programmable gate array (FPGA), and a graphics processing unit (GPU) or may be realized in cooperation of software and hardware. The program may be stored in advance in a storage device (a storage device including a non-transient storage medium) such as a hard disk drive (HDD) or a flash memory of the control device 100. Alternatively, the program may be stored in a removable storage medium such as a DVD or a CD-ROM and when the storage medium (non-transient storage medium) is installed in a drive device, the program may be installed in an HDD or a flash memory of the control device 100.

Various sensors 120 (an acquisition unit in the claims) include, for example, a rotation speed sensor, a plurality of temperature sensors, a plurality of pressure sensors, a lubricating oil sensor, an altitude sensor, and a gyro sensor, or the like. The rotation speed sensor detects a rotation speed of a turbine. The temperature sensors each detect a temperature near an intake port of the GT 60 and a temperature immediately downstream of a combustion chamber. The lubricating oil sensor detects a temperature of lubricating oil supplied to a bearing or the like of the GT 60. The pressure sensors each detect a pressure inside a container which accommodates the control device 100 and a pressure near the intake port of the GT 60. The altitude sensor detects an altitude of the flying body 1. The gyro sensor detects an attitude of the airframe 10.

The control device 100 controls the electric motors 14, the first control circuits 20, the storage battery unit 30, the second control circuits 40, the electric generators 50, the GT 60, and the like which have been described above based on operation states thereof or information acquired from the various sensors 120. For example, the control device 100 controls each of the functional constitutions described above to cause the flying body 1 to take off or land or cause the flying body 1 to fly in a prescribed flight state.

The control device 100 controls the flying body 1 based on flight information. The flight information is, for example, information obtained from the detection results of the various sensors 120 and a flight state of the flying body 1 according to a control signal. When the flight state of the flying body 1 is a first state in which a plurality of GTs 60 are operating and the flying body 1 has taken off, the control device 100 causes at least one GT 60 of the plurality of GTs 60 to stop, causes the other GTs 60 which have not stopped to operate, for example, within an efficient operation range in which the other GTs 60 can operate efficiently, and causes an electric power to be output to the electric generators 50 corresponding to the other GTs 60. When the flight state of the flying body 1 is a second state different from the first state, the control device 100 controls the flying body 1 by causing the plurality of GTs 60 to operate.

Figure 3:
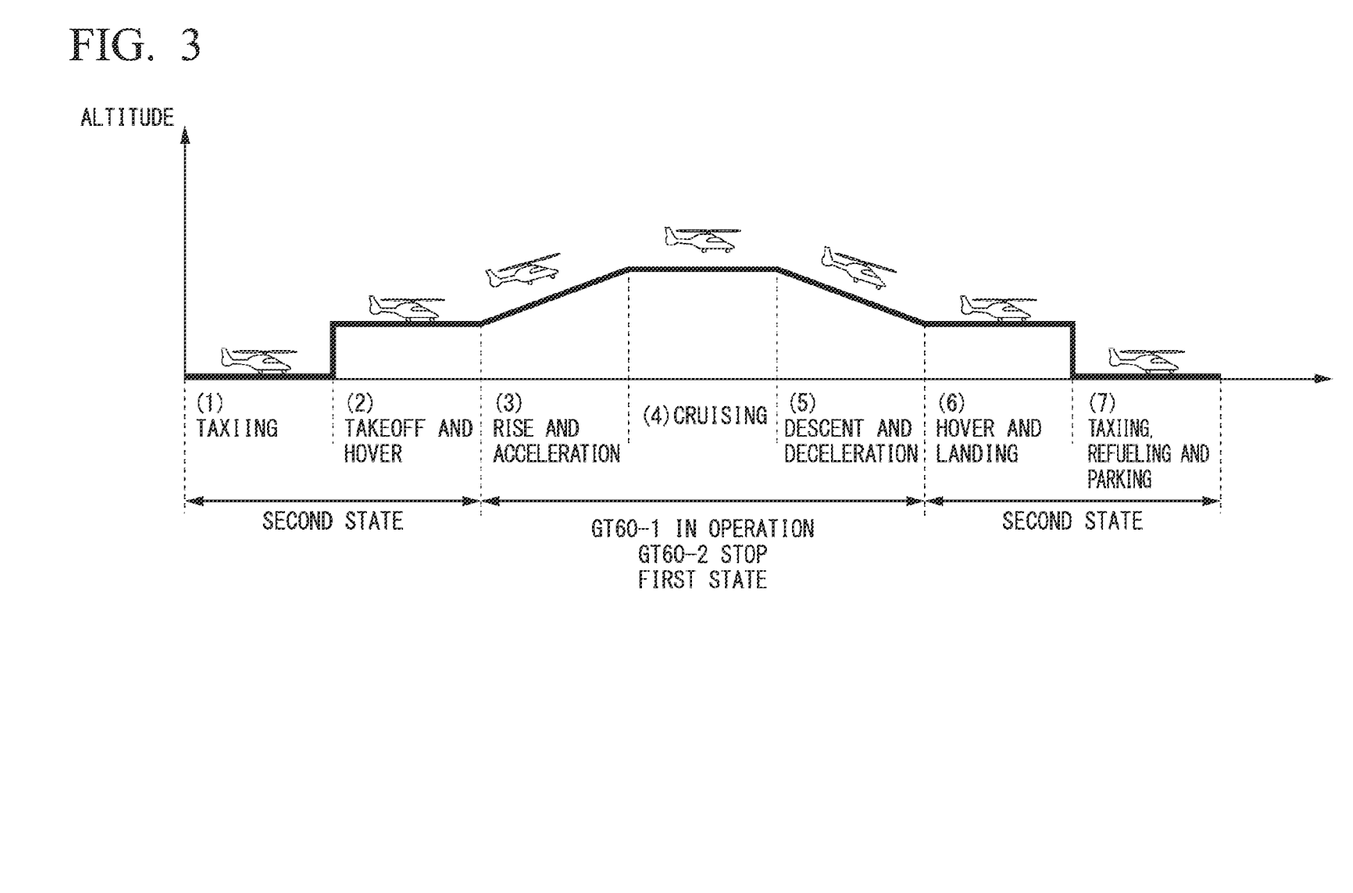
FIG. 3 is a diagram for explaining a flight state of the flying body 1.

FIG. 3 is a diagram for explaining a flight state of the flying body 1. As shown in FIG. 3, the flying body 1 (1) taxies, (2) takes off, hovers (is made to hover), (3) rises and accelerates, and (4) cruises. Moreover, the flying body 1 (5) descends and decelerates, (6) hovers, lands, (7) taxies, is fueled again, and parks. A state in which the flying body 1 reaches a prescribed altitude and then moves in a direction including a horizontal direction is the first state. The first state is, for example, a state in which the flying body 1 cruises shown in FIG. 3 or states in which the flying body 1 rises shown in FIG. 3, accelerates, cruises, descends, and decelerates (3) to (5) shown in FIG. 3. In the following description, the first state is assumed to be a state in which the flying body 1 rises, accelerates, cruises, descends, and decelerates. For example, a state in which the flying body 1 takes off or lands and states in which the flying body 1 taxies, is fueled again, and is parked (1), (2), (6), and (7) are included in the second state.

Among the flight states described above, for example, when the flying body 1 takes off, hovers, or lands (in the case of being in the second state), the control device 100 causes the GT 60-1 and the GT 60-2 to operate within an efficient operation range. An electric power output when the GT 60-1 and the GT 60-2 are operating within an efficient operation range is an electric power equal to or more than a required electric power or close to a required electric power in a state in which the flying body 1 is taking off, hovering, or landing.

Among the flight states described above, for example, when the flying body 1 rises, accelerates, and cruises, or descends and decelerates (in the case of being in the first state), the control device 100 causes the GT 60-1 to operate within the efficient operation range and causes the GT 60-2 to stop. An electric power output when the GT 60-1 operates within the efficient operation range is an electric power equal to or more than a required electric power or close to the required electric power in a state in which the flying body 1 rises, accelerates, and cruises or descends and decelerates. The GT 60-1 and the GT 60-2 have, for example, specifications which satisfy the above conditions.

The required electric power is an electric power required for the flying body 1 so that the flying body 1 transitions to a flight state according to a control signal or is maintained in a flight state. The control device 100 controls the flying body 1 so that the flying body is in a flight state according to a control signal when the required electric power is provided to the electric motor 14 and the electric motor 14 drives the rotor 12 based on the required electric power. The required electric power required in the first state is, for example, an electric power equal to or less than an electric power which can be output by the electric generator 50 corresponding to the other GT 60 when the other GT 60 which has not been stopped is operating within an efficient operation range. The required electric power required in the first state is an electric power which exceeds the electric power which can be output by the other GT 60 described above, but may be an electric power equal to or less than the electric power which can be supplied by the storage battery 32. In other words, although the electric power generated in real time is insufficient, the electric power which is the required electric power or more is supplied to the electric motor 14 when an electric power is supplemented from the electric power accumulated in advance in the storage battery 32. The required electric power required in the first state can be supplied from the storage battery 32 when the operation of the GT 60-1 and the GT 60-2 to stop has stopped and an electric power is not supplied to the storage battery 32.

As described above, when the flight state of the flying body 1 is the first state after the GT 60-1 and the GT 60-2 are in operation and the flying body 1 takes off, for example, the control device 100 causes the remaining GT 60-2 to stop while operating the GT 60-1 which is a part of the GT 60-1 and the GT 60-2.

[Details of Gas Turbine Engine]

The GT 60-1 includes, for example, an intake port (not shown), a compressor, a combustion chamber, a turbine, and the like. The compressor compresses intake air suctioned from the intake port. The combustion chamber is disposed downstream of the compressor, burns a gas which is a mixture of the compressed air and fuel to generate combustion gas. The turbine is connected to the compressor and rotates integrally with the compressor due to a force of the combustion gas. When an output shaft of the turbine rotates due to the above rotation, an electric generator 50 connected to the output shaft of the turbine operates.

Figure 4:
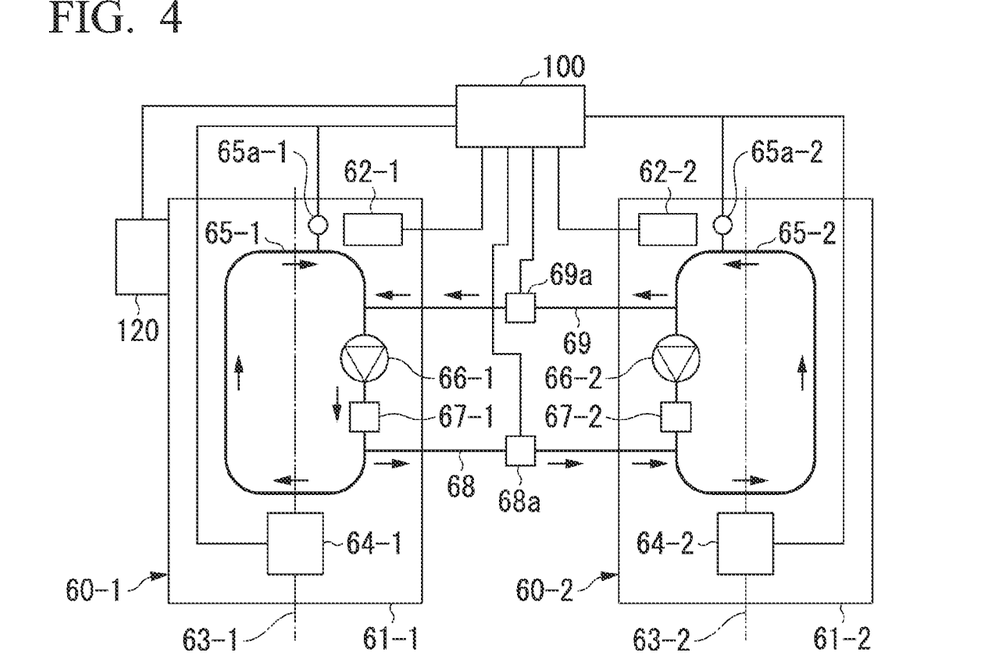
FIG. 4 is a diagram showing an example of a functional constitution of GTs 60-1 and 60-2.
Figure 5:
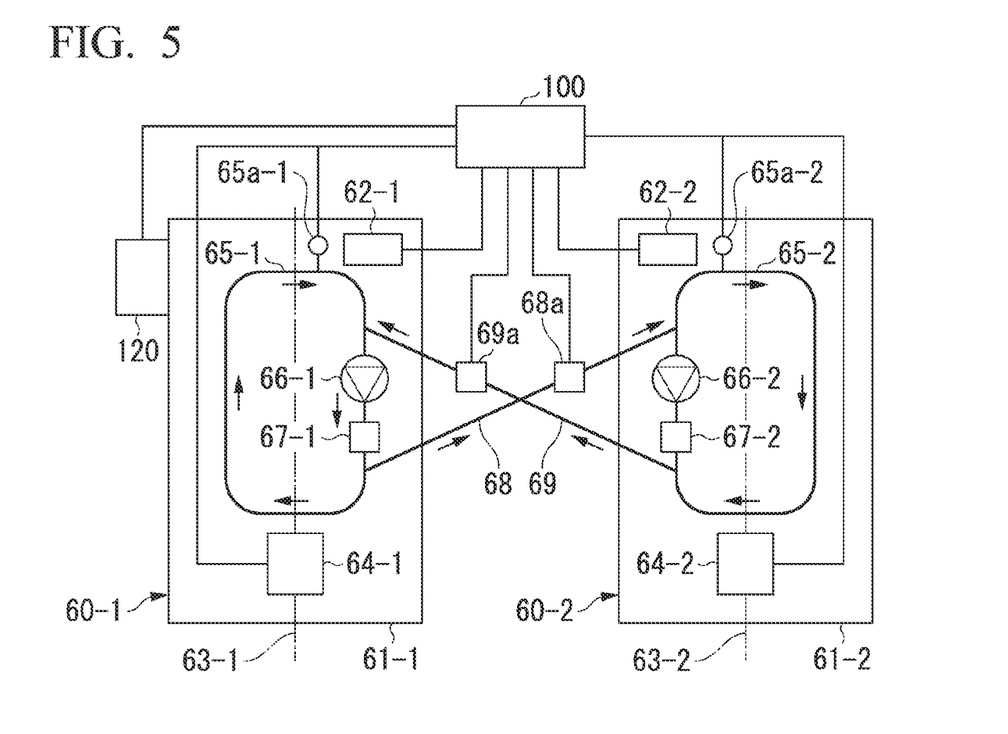
FIG. 5 is a diagram showing another example of the functional constitution of the GTs 60-1 and 60-2.

FIG. 4 is a diagram showing an example of a functional constitution of the GTs 60-1 and 60-2. FIG. 5 is a diagram showing another example of the functional constitution of the GTs 60-1 and 60-2.

The GT 60-1 further includes a casing 61-1, a fuel shutoff valve 62-1, an engine shaft 63-1, a starter motor 64-1, a circulator 65-1 (a circulator in the claims), a fluid pressure pump 66-1, and a discharge check valve 67-1.

The casing 61-1 has each constitution of the GT 60-1 accommodated therein.

The fuel shutoff valve 62-1 switches between supplying and shutting off the fuel supplied to the combustion chamber. The fuel shutoff valve 62-1 is connected to the control device 100. The fuel shutoff valve 62-1 is controlled by the control device 100. When the fuel shutoff valve 62-1 is in an open state, fuel is supplied to the combustion chamber and the GT 60-1 operates. When the fuel shutoff valve 62-1 is in a closed state, the supply of fuel to the combustion chamber stops and the GT 60-1 stops.

The engine shaft 63-1 connects the compressor to the turbine. The engine shaft 63-1 rotates as the turbine rotates. The engine shaft 63-1 is connected to the electric generator 50-1 (not shown in FIG. 4). A part of the engine shaft 63-1 (a low-pressure-based shaft which will be described later) functions as the output shaft. The electric generator 50 operates by rotating the engine shaft 63-1.

In the embodiment, the GT 60-1 is a so-called twin spool type engine as disclosed, for example, in Japanese Unexamined Patent Application, First Publication No. 2005-226584.

As an example other than the embodiment, the GT 60-1 may be a so-called single spool type engine. In this case, although the engine shaft 63-1 does not have the above-described low-pressure-based shaft, the engine shaft 63-1 has a high-pressure-based shaft. Furthermore, the electric generator 50 is connected to the high-pressure-based shaft and the electric generator 50 generates electricity based on the rotation of the high-pressure-based shaft. In this case, the high-pressure-based shaft is supported by the casing 61-1 via the first bearing.

The starter motor 64-1 is connected to the engine shaft 63-1 of the GT 60-1. The starter motor 64-1 rotates (idles) the GT 60-1 when the supply of fuel to the GT 60-1 is stopped so that the GT 60-1 can operate.

The circulator 65-1 is a circuit (a flow path) in which a working fluid circulates. The working fluid is a fluid required for the operation of the GT 60-1. In the embodiment, the working fluid is lubricating oil supplied to the first bearing and the second bearing. When the GT 60-1 operates, the engine shaft 63-1 rotates due to the combustion gas as described above. The lubricating oil not only functions as lubricating oil for each bearing, but also functions as a refrigerant which exhausts heat transferred from the combustion gas to each bearing. The GT 60 which is in operation (for example, the GT 60-1) is maintained at a relatively high temperature because a working fluid receives heat from the combustion gas. On the other hand, a temperature of the working fluid in the GT 60 which is in operation (for example, the GT 60-2) does not rise because the working fluid does not receive heat from the combustion gas.

When the flying body 1 cruises over the sky, an outside air temperature decreases with a flight altitude of the flying body 1. For this reason, the working fluid is in a harsher environment than the ground from the viewpoint of freezing. The outside air temperature of the flying body 1 during cruising is, for example, about −45° C.

Both of the fluid pressure pump 66-1 and the discharge check valve 67-1 are provided in the circulator 65-1.

The fluid pressure pump 66-1 causes the working fluid to circulate in the circulator 65-1. In other words, the fluid pressure pump 66-1 serves as a drive source for the circulator 65-1. The fluid pressure pump 66-1 is, for example, a mechanical type pump (a mechanical pump). The fluid pressure pump 66-1 may be, for example, an electrical type pump.

The discharge check valve 67-1 is located on a downstream side of the fluid pressure pump 66-1 in the circulator 65-1. The discharge check valve 67-1 regulates the backflow of the working fluid in the circulator 65-1.

In the embodiment, a fluid sensor 65a-1 is further provided in the circulator 65-1. The fluid sensor 65a-1 is a lubricating oil sensor among various sensors 120. The fluid sensor 65a-1 acquires at least one of a temperature and a pressure of the working fluid circulating in the circulator 65-1. In the embodiment, the fluid sensor 65a-1 acquires both of the temperature and the pressure of the working fluid. A position in which the fluid sensor 65a-1 is disposed is not particularly limited in the circulator 65-1. The fluid sensor 65a-1 is connected to the control device 100. The acquisition result of the fluid sensor 65a-1 (that is, the temperature and the pressure of the working fluid) is sent to the control device 100.

Also, in the embodiment, the flying body 1 (the aircraft propulsion system) further includes a plurality of communication pipes 68 and 69. The plurality of communication pipes 68 and 69 communicate a circulator 65-1 in the GT 60-1 among a plurality of GTs 60-1 (hereinafter referred to as a "first circulator 65-1") with a circulator 65-1 in the GT 60-2 among the plurality of GT 60-1 (hereinafter referred to as a "second circulator 65-2"). The plurality of communication pipes 68 and 69 include a first communication pipe 68 and a second communication pipe 69.

In the example shown in FIG. 4, the first communication pipe 68 communicates a portion of the first circulator 65-1 which is located on a downstream side of the fluid pressure pump 66-1 and the discharge check valve 67-1 with a portion of the second circulator 65-2 which is located on a downstream side of a fluid pressure pump 66-2 and a discharge check valve 67-2. The second communication pipe 69 communicates a portion of the first circulator 65-1 which is located on an upstream side of the fluid pressure pump 66-1 and the discharge check valve 67-1 with a portion of the second circulator 65-2 which is located on an upstream side of the fluid pressure pump 66-2 and the discharge check valve 67-2.

As in another example shown in FIG. 5, the first communication pipe 68 may communicate a portion of the first circulator 65-1 which is located on a downstream side of the fluid pressure pump 66-1 and the discharge check valve 67-1 with a portion of the second circulator 65-2 which is located on an upstream side of the fluid pressure pump 66-2 and the discharge check valve 67-2. In this case, the second communication pipe 69 communicates a portion of the first circulator 65-1 which is located on an upstream side of the fluid pressure pump 66-1 and the discharge check valve 67-1 with a portion of the second circulator 65-2 which is located on a downstream side of the fluid pressure pump 66-2 and the discharge check valve 67-2.

The working fluid flows between the first circulator 65-1 and the second circulator 65-2 through the plurality of communication pipes 68 and 69. For example, the working fluid is sent from the first circulator 65-1 to the second circulator 65-2 through the first communication pipe 68. For example, the working fluid is sent from the second circulator 65-2 to the first circulator 65-1 through the second communication pipe 69.

Heat is transferred between the first circulator 65-1 and the second circulator 65-2 by causing the working fluid to flow between the first circulator 65-1 and the second circulator 65-2 through the plurality of communication pipes 68 and 69. The plurality of communication pipes 68 and 69 are provided for the purpose of heat transfer in this way. For this reason, a cross-sectional area of the flow paths of the communication pipes 68 and 69 may be adopted as long as it has a size in which heat transfer is possible. For example, the cross-sectional area of the flow path of each of the communication pipes 68 and 69 may be smaller than a cross-sectional area of the flow path of each of the circulators 65-1 and 65-2.

In the embodiment, valves 68a and 69a are provided in the plurality of communication pipes 68 and 69. The valves 68a and 69a switch the communication and the cutoff between the circulators 65-1 and 65-2 using the communication pipes 68 and 69. The valves 68a and 69a are connected to the control device 100. The valves 68a and 69a are controlled by the control device 100. The control device 100 opens the valves 68a and 69a when the flying body 1 is in the first state. The control device 100 closes the valves 68a and 69a when the flying body 1 is in the second state.

Example of Control of Gas Turbine Engine and Valve

An example of control of the GTs 60-1 and 60-2 and the valves 68a and 69a will be described below.

In this control, the control device 100 first determines whether the flying body 1 is in the first state or the second state. The control device 100 may determine whether the flying body 1 is in the first state or the second state based on the flight information including an outside air temperature acquired by the various sensors 120 (temperature sensors). Here, the various sensors 120 for acquiring the outside air temperature may be attached to the airframe of the flying body 1 or may be attached to the casing 61-1 of the GT 60-1 (refer to FIGS. 3 and 4).

When the flying body 1 is in the second state such as during takeoff or during landing, the control device 100 closes the valves 68a and 69a while operating both of the GTs 60-1 and 60-2. When the valves 68a and 69a are closed, the working fluid circulates inside each of the circulators 65-1 and 65-2 (that is, the first circulator 65-1 and the second circulator 65-2) in the GTs 60-1 and 60-2. Thus, for example, there is no extra pressure loss of the working fluid and the working fluid functions effectively. As a result, the GTs 60-1 and 60-2 operate stably.

When the flying body 1 is in the first state such as during cruising, the control device 100 stops the remaining GT 60-1 while operating a part of the plurality of GTs 60-1 as described above. In the embodiment, for example, the GT 60-2 is caused to stop while operating the GT 60-1.

At this time, if the valves 68a and 69a are kept closed, the working fluid circulates inside the circulators 65-1 and 65-2 (that is, the first circulator 65-1 and the second circulator 65-2) in the GTs 60-1 and 60-2. As a result, in the GT 60-1 which is in operation, it is possible to maintain the working fluid at a high temperature while causing the working fluid to exert a function as a working fluid by causing the working fluid to circulate in the circulator 65-1. On the other hand, in the GT 60-2 which has stopped, a temperature of the working fluid gradually decreases. As a result, the working fluid may freeze.

Thus, when the flying body 1 is in the first state, in the embodiment, for example, any one of the following two control methods can be adopted.

(First Control Method)

A first control method is a control method in which the acquisition result of a fluid sensor 65a is not utilized. In the first control method, the valves 68a and 69a are opened as the GT 60-2 stops while operating the GT 60-1.

Thus, the first circulator 65-1 and the second circulator 65-2 communicate with each other through the plurality of communication pipes 68 and 69. Therefore, it is possible to cause the working fluid circulating in the first circulator 65-1 and the working fluid circulating in the second circulator 65-2 to circulate through the plurality of communication pipes 68 and 69. At this time, for example, it is possible to cause the working fluid to flow from the first circulator 65-1 to the second circulator 65-2 through the first communication pipe 68 and cause the working fluid to flow from the second circulator 65-2 to the first circulator 65-1 through the second communication pipe 69. As a result, a high-temperature working fluid is supplied from the first circulator 65-1 to the second circulator 65-2 and a decrease in temperature of the working fluid of the second circulator 65-2 is minimized (Second Control Method)

A second control method is a control method in which the acquisition result of the fluid sensor 65a is utilized. In the second control method, when the GT 60-2 is stopped while operating the GT 60-1, the valves 68a and 69a are kept closed.

Thus, the working fluid is kept circulating inside the circulators 65-1 and 65-2 (that is, the first circulator 65-1 and the second circulator 65-2) in each GT 60-1. As a result, in the GT 60-1 which is in operation, it is possible to maintain the working fluid at a high temperature. On the other hand, in the GT 60-2 which has stopped, a temperature of the working fluid gradually decreases.

Here, the control device 100 can detect a decrease in temperature of the working fluid of the second circulator 65-2 based on the acquisition result of the fluid sensor 65a-2. The control device 100 opens the valves 68a and 69a based on this acquisition result when it is determined that the temperature or the pressure of the working fluid of the second circulator 65-2 is equal to or lower than a prescribed first threshold value.

Thus, the first circulator 65-1 and the second circulator 65-2 communicate with each other through the plurality of communication pipes 68 and 69. As a result, a high-temperature working fluid is supplied from the first circulator 65-1 to the second circulator 65-2 and the working fluid of the second circulator 65-2 is heated.

The first threshold value is, for example, a temperature higher than a freezing point of the working fluid or a value indicating a pressure corresponding to the temperature.

After that, when the temperature or the pressure of the working fluid of the second circulator 65-2 is equal to or more than a prescribed second threshold value, the control device 100 closes the valves 68a and 69a.

Thus, the working fluid circulates again only inside the circulators 65-1 and 65-2 in the GTs 60-1 and 60-2.

The second threshold value is a value indicating a temperature or a pressure higher than the first threshold value.

After that, in the same manner as described above, the temperature or the pressure of the working fluid circulating in the second circulator 65-2 is maintained between the first threshold value and the second threshold value by repeatedly performing the opening and the closing of the valves 68a and 69a based on the acquisition result of the fluid sensor 65a-2. As a result, freezing of the working fluid is minimized.

The control device 100 may switch the GT 60 to operate in the process of repeatedly performing the opening and the closing of the valves 68a and 69a. In other words, the operation of the GT 60-1 and the GT 60-2 may be switched based on the acquisition result of the fluid sensor 65a-1.

For example, when it is determined using the control device 100 that the temperature or the pressure of the working fluid of the second circulator 65-2 is equal to or more than a prescribed second threshold value based on the acquisition result of the fluid sensor 65a-2, the control device 100 may close the valves 68a and 69a, stop the GT 60-1 which has been operating until then, and operate the GT 60-2 which has stopped until then. In this case, since the working fluid is heated in advance before the operation of the GT 60-2, a warm-up operation time required for a transition from the starting-up of the GT 60-2 to a rated maximum output operation can be shortened or eliminated.

In this way, when the flying body 1 is in the first state, the control device 100 may alternately operate the GT 60-1 and the GT 60-2.

As described above, according to the flying body 1 associated with the embodiment, for example, when the GT 60-2 has stopped while the GT 60-1 has been operating, and the like, it is possible to supply the working fluid circulating in the first circulator 65-1 which has a relatively high temperature to the second circulator 65-2 and cause this working fluid to circulate in the second circulator 65-2. Thus, even if the GT 60-2 has stopped, it is possible to increase a temperature of the working fluid circulating in the second circulator 65-2. As a result, it is possible to minimize freezing of the working fluid in the GT 60-2 and it is possible to improve the restartability of the GT 60-2.

The technical scope of the present invention is not limited to the above-described embodiment and various modifications are possible without departing from the gist of the present invention.

The valves 68a and 69a may be omitted. Even in this case, for example, when an internal pressure of the working fluid in the circulators 65-1 and 65-2 is appropriately adjusted, it is possible to cause the working fluid to circulate between the circulators 65-1 and 65-2 through the communication pipes 68 and 69.

In addition, it is possible to replace the constituent elements in the above-described embodiment with well-known constituent elements as appropriate without departing from the gist of the present invention and the above-described modified examples may be appropriately combined.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1 Flying body (aircraft)
10 Airframe
12 Rotor
14 Electric motor
50 Electric generator
60 GT (engine)
63 Engine shaft
65 Circulator
65a Fluid sensor
66 Fluid pressure pump
68 First communication pipe
68a, 69a Valve
69 Second communication pipe
100 Control device (controller)
120 Various sensors (acquisition units)

What is claimed is:

1. An aircraft propulsion system, including:
a plurality of engines attached to an airframe of an aircraft;
an electric generator connected to an engine shaft of each of the engines;
a plurality of electric motors driven using an electric power including an electric power generated by the electric generator;

a plurality of rotors attached to the airframe of the aircraft and driven using a driving force output by the electric motor; and a controller which controls an operation state of the plurality of engines, in which the controller causes a first portion of the plurality of engines to operate while stopping a second portion of the plurality of engines where a flight state of the aircraft is a first state being after the plurality of engines are operating and the aircraft has taken off, wherein each engine of the plurality of engines is associated with a circulator, of a plurality of circulators, having a working fluid circulating therein, wherein the working fluid is lubricating oil, and wherein, during the first state, a plurality of communication pipes which provide for communication of the working fluid between a first circulator, of the plurality of circulators, in a first engine, of the first portion of the plurality of engines, and a second circulator, of the plurality of circulators, in a second engine, of the second portion of the plurality of engines.

2. The aircraft propulsion system according to claim 1, wherein a first fluid pressure pump which causes the working fluid to circulate in the first circulator is provided in the first circulator, a second fluid pressure pump which causes the working fluid to circulate in the second circulator is provided in the second circulator, the plurality of communication pipes comprise a first communication pipe and a second communication pipe, the first communication pipe communicates a first portion of the first circulator in the first engine, which first portion of the first circulator is located on a downstream side of the first fluid pressure pump, with a first portion of the second circulator in the second engine, which first portion of the second circulator is located on an upstream side of the second fluid pressure pump, and the second communication pipe communicates a second portion of the first circulator in the first engine, which second portion of the first circulator is located on an upstream side of the first fluid pressure pump, with a second portion of the second circulator in the second engine, which second portion of the second circulator is located on a downstream side of the second fluid pressure pump.

3. The aircraft propulsion system according to claim 1, wherein a valve is provided in each communication pipe of the plurality of communication pipes.

4. The aircraft propulsion system according to claim 3, wherein, for each respective valve, the controller opens the respective valve where a flight state of the aircraft is in the first state and closes the respective valve in other cases.

5. The aircraft propulsion system according to claim 1, wherein the controller causes the first engine and the second engine to operate alternately when the flight state of the aircraft is in the first state.

6. The aircraft propulsion system according to claim 5, wherein a first fluid sensor that acquires at least one of a temperature or a pressure of the working fluid circulating in the first circulator is provided in the first circulator, a second fluid sensor that acquires at least one of a temperature or a pressure of the working fluid circulating in the second circulator is provided in the second circulator, and the controller switches an operation of at least one of the first engine or the second engine based on an acquisition result of the respective one of the first fluid sensor or the second fluid sensor.

7. The aircraft propulsion system according to claim 1, further comprising:

an acquisition part which acquires flight information associated with flight of the aircraft, wherein the controller controls an operation state of the plurality of engines based on the flight information acquired by the acquisition unit.

8. The aircraft propulsion system according to claim 1, wherein the first state is a state in which the aircraft reaches a prescribed altitude and then moves in a direction including a horizontal direction.

9. The aircraft propulsion system according to claim 1, wherein the controller controls the aircraft by causing the plurality of engines to operate where the flight state of the aircraft is in a second state that is different from the first state.

10. The aircraft propulsion system according to claim 1, wherein the lubricating oil is supplied to a bearing that supports the engine shaft.

* * * * *